UNITED STATES PATENT OFFICE.

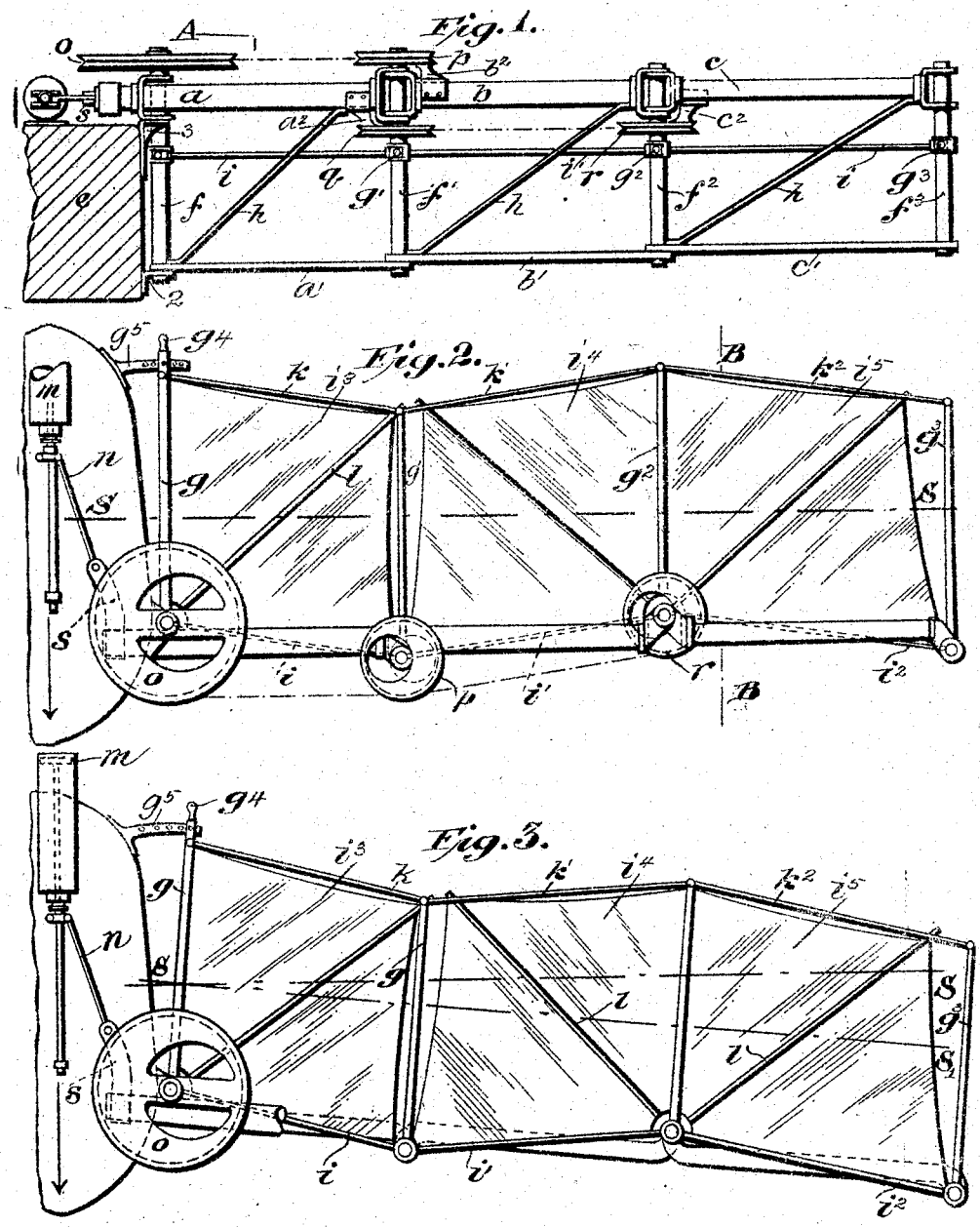

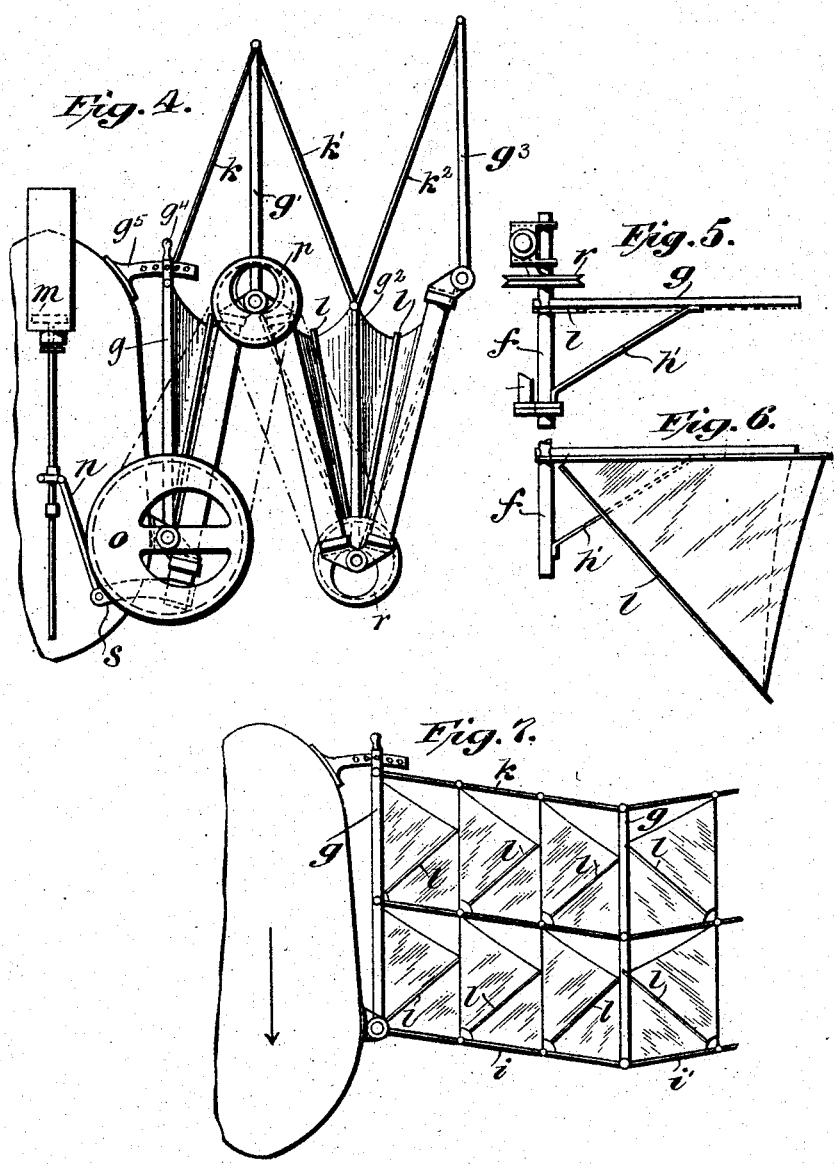

JOSEPH HOFMANN, OF BERLIN, GERMANY.

WING OF FLYING-MACHINES.

No. 827,017.      Specification of Letters Patent.      Patented July 24, 1906.

Application filed June 27, 1902. Serial No. 113,482.

*To all whom it may concern:*

Be it known that I, JOSEPH HOFMANN, a subject of the German Emperor, residing at 71 Belle-Alliance-Strasse, Berlin, Germany, have invented certain new and useful Improvements in the Wings for Flying-Machines, of which the following is a specification.

Where kites, aeroplanes, or other flying-machines or apparatus are provided with carrying-surfaces, such as parachutes and the like, it is important in their flight that these surfaces should not be spread out until they are about to be used and that they should be kept closed when not in use. This is done in a more or less perfect manner by birds in the use of their wings.

In those cases where the construction of the wings of insects has been imitated too great a rearward extension of the surface has been obtained for repose and for movement of the machine running on the ground or too small a lateral projection of the surface for flight. The wings of flying-machines should therefore be articulated similar to the wings of birds or bats—that is, they should be subdivided into three or more parts, said parts being in articulated connection with each other, so that they are enabled to turn as a whole in the same direction or in opposite direction to each other, just as, for an example, the human arm can do when it turns straight in the shoulder or when upper arm, forearm, and hand are bent in a zigzag line.

In the accompanying drawings, which represent my invention in its simplest form, Figure 1 is a front elevation, and Fig. 2 is a plan, of a left-hand wing of a flying-machine. Fig. 3 shows the same wing when turned in its shoulder somewhat forward, and Fig. 4 when folded together. Fig. 5 is a transverse section of the wing at B B, Fig. 2, when stretched out; and Fig. 6, a side elevation of the wing when folded together. Fig. 7 shows a top view similar to that shown in Fig. 2, except that the supporting-surface, which is formed in Fig. 2 by one single sail, is subdivided at Fig. 7 into six sails.

The reference-letter $e$ indicates a portion of a flying-machine which is provided with suitable brackets 2 and 3, in which is journaled a shaft $f$. Connected with the shaft $f$ is a pair of parallel girder-sections $a$ and $a'$. The outer ends of the girder-sections $a$ and $a'$ are connected in any suitable manner with a shaft $f'$. Also connected with the shaft $f'$ is a pair of parallel girder-sections $b$ and $b'$, the outer ends of which are suitably connected with a shaft $f^2$, with which is also connected a pair of girder-sections $c$ and $c'$, the outer ends of which are suitably connected with a shaft $f^3$.

It will be understood that the several pairs of girder-sections are pivotally connected, and thus adapted to be folded together or straightened out in the manner hereinafter described. Each pair of parallel girder-sections preferably is connected by a diagonally-extending brace-rod $h$, which may be arranged either as shown in Fig. 1 or Fig. 5. Mounted between the shafts $f$, $f'$, $f^2$, and $f^3$ in such manner as to pass behind the brace-rods $h$ is a plurality of web-carrying rods $i$, $i'$, and $i^2$.

Extending rearwardly from each of the shafts $f, f', f^2$, and $f^3$, on a level with the web-carrying rods $i$, $i'$, and $i^2$, is a plurality of rods $g$, $g'$, $g^2$, and $g^3$, the rear ends of which are connected by a plurality of rear rods $k$, $k'$, and $k^2$. Each of the rods $g$, $g'$, $g^2$, and $g^3$ is stiffened by a brace $h'$, Figs. 5 and 6, in suitable connection with the shafts $f, f', f^2$, and $f^3$. The inner rearwardly-extending rod $g$—that is, the rod nearest the ship-body $e$—is formed at its rear end with a handle $g^4$ and is adapted to be locked in any adjustable position by a suitable pin adapted to engage any one of a series of perforations in a bracket $g^5$. The inner rod $g$ is rigidly connected at its forward end to the shaft $f$, so as to hold said shaft stationary or to rotate it slightly whenever necessary irrespective of the independent pivotal movement of the girder-sections $a$ and $a'$ on said shaft $f$. Rigidly connected with the upper end of the shaft $f$ in any suitable manner, so as to be under the control of the handle-lever $g^4$, is a peripherally-grooved disk or controlling member $o$, which is geared up in any suitable manner, as by means of an endless belt, with a similar disk $p$, journaled on the shaft $f'$ and rigidly connected with the girder-section $b$ by means of a bracket $b^2$. Journaled upon the shaft $f'$ and rigidly connected with the girder-section $a$ by a bracket $a^2$ is a disk $q$, which is suitably geared up with a disk $r$, journaled upon the shaft $f^2$ and rigidly connected with the girder-section $c$ by means of a bracket $c^2$. Connected with the web-carrying rods $i$, $i'$, and $i^2$ in any suitable manner are webs or sprit-sails $i^3$ $i^4$ $i^5$, each having a diagonally-extending sprit or stiffening member $l$. The sprit-sail $i^3$, in addition to being secured to the rod $i$, is secured to the rearwardly-extending rod $g$, while the sprit-sails $i^4$ and $i^5$, in addition to being secured at their forward ends to the rods $i'$ and $i^2$, are secured to the rearwardly-extending rod $g^2$. The sprits $l$ are free at their rear ends and are so connected at their forward ends with one of the shafts $f$ and $f^2$ that their free rear ends can drop down into the position shown in Fig. 6 when the sprit sails or webs are folded, as hereinafter described.

The girder-section $a$ has at its inner end an arm $s$, to which is secured a link-rod $n$, the opposite end of which is connected with the piston-rod of a cylinder $m$, adapted to be operated in any suitable manner.

Constructed as described the device is operated in the following manner: When it is desired to fold the wing into the position shown in Fig. 4, the cylinder $m$ is operated to swing the first or inner girder-section $a$ in a rearward direction. By reason of the fact that the disk or controlling member $o$ is held stationary during the rearward swinging movement of the girder-section $a$ the disk $p$ is rotated on the shaft $f'$ in such manner as to swing the second girder-section $b$ in a forward direction. The disk $q$ being held against rotation during the rearward movement of the section $a$ causes the disk $r$ to rotate in such manner as to swing the girder-section $c$ in a rearward direction with respect to the section $b$.

The line S S in Figs. 2 and 3 indicates the center of balance which the wing occupies when the air-ship is moving in a horizontal plane. If the wing be moved forward to the line S S', the vessel will be guided upward or caused to soar, and if the wing be moved rearward, the vessel will glide downward. The forward and backward adjustments of the wing are secured by simultaneously operating the cylinder $m$ and the handle-lever $g^4$. If the wing is moved forward, as shown in Fig. 3, the handle $g$ is simultaneously moved outward so as to cause the disk or controlling member $o$ to rotate with the wing, whereby all the other disks or controlling members $p$, $q$, and $r$ remain stationary with respect to the girder-sections and the relative positions of the girder-sections are not changed. In other words, when the handle-lever $g^4$ is moved simultaneously with the cylinder $m$ the whole wing is swung forward or backward without causing the sections to fold on each other, but when the inner girder-section $a$ is moved by the cylinder $m$ while the disk $o$ is held stationary by the handle-lever $g^4$ the several girder-sections are folded on each other in the manner previously described.

It will be observed from Figs. 2 and 3 that the sprits $l$ are of such length that they fit underneath the rear rods $k$, $k'$, and $k^2$, Figs. 2 and 3, or underneath the rearwardly-extending rods $g'$, Fig. 7, at their rear ends. As the pressure upon the wing of an air-ship is practically upward on account of the tendency of the ship to descend, the rods $k$, $k'$, and $k^2$ brace the free rear ends of the sprits $l$, and thus impart to the wing the necessary rigidity.

It is obvious that many modifications may be made in the construction of parts of the device without departing from my invention. Thus sails of different shapes may be substituted for the sprit-sails shown, or the parallelograms $i\,g\,k\,g$ may be divided into smaller parallelograms, as shown in Fig. 7, so that instead of a single sail for each division of the wing several sails might be used, especially in larger machines. It is also evident that the system of bracing might be materially changed in many ways and that the girders might be duplicated instead of being single, as shown.

Having thus described my invention, what I claim as new therein, and desire to secure by Letters Patent, is—

1. A wing having a plurality of girder-sections pivotally connected with each other end to end, mechanism for simultaneously folding said sections upon each other, and webs connected with said sections.

2. A wing having a plurality of girder-sections pivotally connected with each other, and means controlled by movement of one section for folding or unfolding the other sections.

3. A wing having a plurality of pivotally-connected girder-sections, means operating upon one of said sections for folding and unfolding said sections, and means for moving the entire wing.

4. A wing comprising a plurality of pivotally-connected girder-sections, a plurality of rearwardly-extending rods connected with the girder-sections, and webs connected with said girder-sections and rods.

5. A wing comprising a plurality of pivotally-connected girder-sections, a plurality of rearwardly-extending rods, and a plurality of webs, each of said webs being connected along its forward edge with one of the girder-sections and along one of its side edges with one of the rearwardly-extending rods.

6. A wing having a plurality of girder-sections pivotally connected end to end, and controlling members mounted in line with the pivot-points of the girder-sections for controlling the movements of the sections.

7. A wing having a plurality of girder-sections pivotally connected end to end, means for moving one of said sections, a controlling member mounted in line with the pivot-point of said last-mentioned girder-section, means for holding said controlling member stationary or operating it independently of said last-mentioned girder-section, and a plurality of other controlling members suitably connected with the first-mentioned controlling member and mounted in line with the pivot-points of the other girder-sections for controlling the movements of said sections.

8. The combination of a support, an inner girder-section pivotally connected with said support, a plurality of other girder-sections pivotally connected end to end with said inner girder-section and with each other, means for moving the inner girder-section, a controlling member mounted in line with the pivot-point of the inner section, a handle-lever for holding said controlling member stationary or for moving the same, and a plurality of other controlling members mounted in line with the pivot-points of the other girder-sections and suitably connected with the first-mentioned controlling member for controlling the movements of the sections.

9. A wing having a plurality of girder-sections pivotally connected end to end, a plurality of rearwardly-extending rods pivotally connected with the girder-sections, a plurality of webs, each connected along its forward edge with one of the girder-sections and along one of its side edges with one of the rearwardly-extending rods, and a stiffening member extending diagonally across each of said webs.

10. A wing having a plurality of girder-sections pivotally connected end to end, a plurality of rearwardly-extending rods pivotally connected with said girder-sections, a plurality of rear rods, parallel with the girder-sections and pivotally connected with the rearwardly-extending rods, a plurality of webs each connected along its forward edge with one of the girder-sections and along one of its side edges with one of the rearwardly-extending rods, and a stiffening member extending diagonally across each of said webs.

Signed this 11th day of June, 1902, at Berlin.

JOSEPH HOFMANN.

Witnesses:
WOLDEMAR HAUPT,
HENRY HASPER.